May 21, 1946. W. W. HURTEL 2,400,512
CLAMPING DEVICE
Filed Nov. 1, 1943
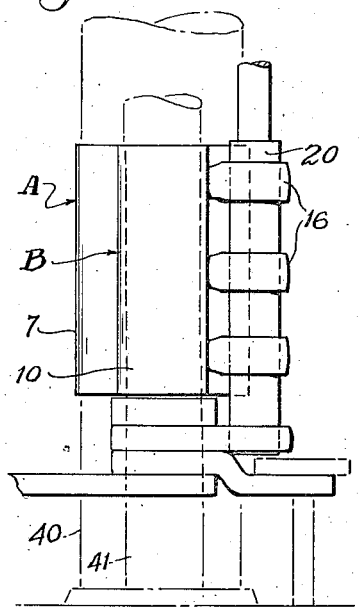
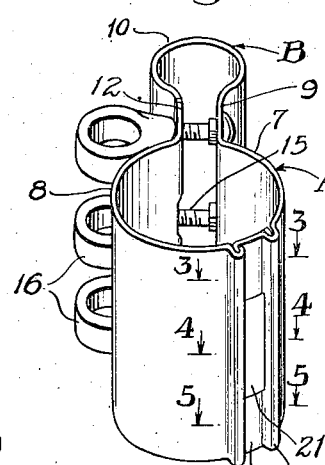
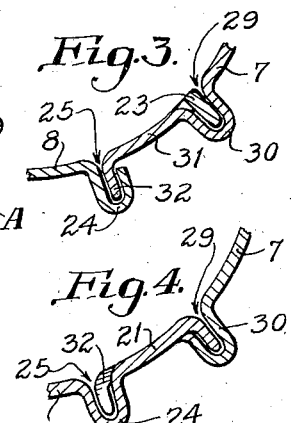
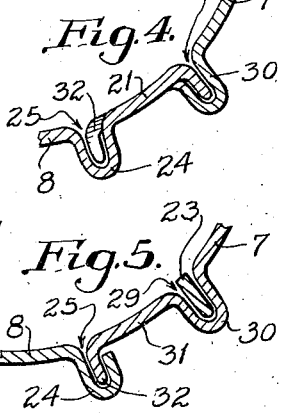
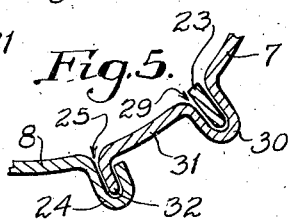
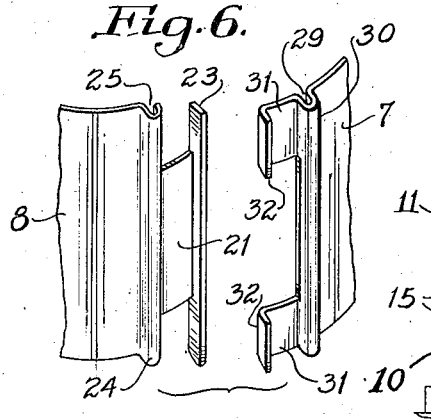
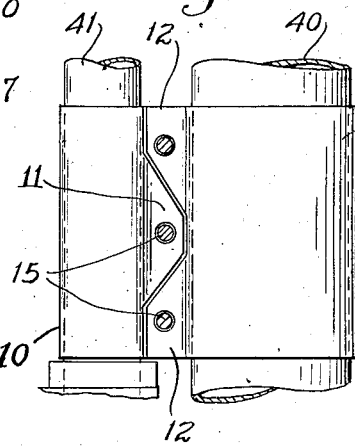
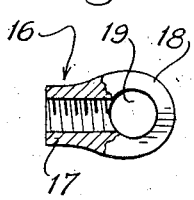
INVENTOR.
William W. Hurtel
BY Albert H. Merrill
ATTORNEY.

Patented May 21, 1946

2,400,512

UNITED STATES PATENT OFFICE 2,400,512

CLAMPING DEVICE

William W. Hurtel, Los Angeles, Calif.

Application November 1, 1943, Serial No. 508,587

3 Claims. (Cl. 24—81)

This invention relates to a clamping device which, in its broader aspect, is utilizable in a great variety of situations to secure two or more different objects to each other, but is more particularly intended to secure two or more elongated cylindrical members together in a fixed, parallel, adjacent relation to each other, and when so used is particularly well adapted to secure to a steering wheel column a locking device of the character set forth in the joint application of Maximilian E. Zimmerman and myself for patent on Means for locking automobiles against self-propulsion, filed March 30, 1942, Serial No. 436,858, which has matured into Patent 2,336,829, granted Dec. 14, 1943.

Among the objects of this invention are: to provide a better looking clamping device of the kind above mentioned which can be quickly stamped out of sheet metal at a low cost; to provide a clamping device wherein certain improved clamping elements are detachably hinged to each other in an improved manner so that they may be quickly interengaged and disengaged without the use of tools; to provide a clamping device which can be quickly taken apart and as quickly reassembled; to provide a clamping device which may be used to clamp together in a more efficient manner objects that are in a spaced apart relation to each other; and to provide a combination of clamping members which includes between parts thereof when in the applied position, a series of alined apertures or bolt holes to receive a locking bolt or locking rod which will prevent unauthorized persons from releasing the clamp.

This clamp is capable of efficient use to clamp together elongated, parallel objects whether such objects extend in vertical, horizontal or inclined planes.

Other objects, advantages and features of invention will hereinafter appear.

Referring to the accompanying drawing, which illustrates what is at present deemed to be a preferred embodiment of the invention, Fig. 1 is an elevation of the clamping device in applied position looking at the front portion or smaller clamping unit thereof.

Fig. 2 is a perspective view of the clamping device illustrating in particular the interlocking portion thereof.

Fig. 3 is an enlarged cross section of the interlocking portion of the device as viewed when looking down from line 3—3 of Fig. 2.

Fig. 4 is an enlarged cross section of the interlocking portion of the device as viewed when looking down from line 4—4 of Fig. 2.

Fig. 5 is an enlarged cross section of the interlocking portion of the device as viewed when looking down from line 5—5 of Fig. 2.

Fig. 6 shows in elevation the interlocking portions of Fig. 2 standing separated and in position to be slid into place for interlocking.

Fig. 7 is mainly a side elevation of the clamping device structure shown in Fig. 1, the three clamping bolts being sectioned, the plane of section being just behind the inner sides of the applied nuts. In this view fragments are shown of two elongated objects which are secured to each other by the device.

Fig. 8 is an enlarged view, partly in plan and partly in mid-section, of one of the locking nuts.

Referring in detail to the drawing, the illustrated embodiment of the invention consists of two clamping unts A and B each of which is made up of a number of parts. The clamping unit A includes a permanent arcuate wing 7 and a detachable arcuate wing 8. The stiff, but slightly resilient sheet metal which forms said wing 7 extendse radially outward from its attached edge thus forming a wing shank 9, beyond which the sheet metal continues, being curved to a C-shape as viewed in cross section, thereby forming the partly tubular member 10. Opposite to the straight wing shank 9, that is to say, at the opposite side of the gap in the C-shaped part 10, said part 10 is furnished with a broad apertured ear 11 and the adjacent edge portion of the detachable wing 8 is furnished at each side with an apertured ear 12, these three ears being beveled to substantially interfit with each other as shown in Fig. 7.

Three clamping bolts 15 are provided one extending through each of the aforesaid apertured ears, the inner sides of the heads of these bolts engaging the outer face of the wing shank 9, it being understood that said shank is suitably apertured to admit said bolts. Onto each of said bolts screws a specially formed nut 16 having a tubular internally threaded shank 17 upon one end of which is formed a head 18 through which a bore or passage 19 extends at a right angle to said shank 17. Said passage 19 is slightly greater in diameter than a locking rod 20 which may be inserted through the apertures 19 of all the three nuts after they have been applied as shown in Fig. 1.

The detachable wing 8 has extending outwardly from the central portion of its free edge a single broad extension or tongue 21 the extremity of which is furnished with a cross arm 23 the length of which equals the width of the wing member of which it forms a part. At the base of said tongue 21 the wing member 8 has extending across its entire width an outwardly directed crimp 24, thus providing across the inside face of this portion of said wing an internal groove 25, said tongue 21, by preference and as shown, being formed as a continuation of the metal sheet which forms the outer side of said crimp 24.

The cross arm 23 is of the nature of an outwardly directed flange, and is arranged to lock into a groove 29 provided by extending an outwardly directed crimp 30 across the permanent wing 7. Said permanent wing 7 carries an outwardly directed extension or tongue 31 at each side, these tongues being sufficiently spaced apart to admit between them the cooperating tongue 21 of the detachable wing 8. Said tongues 31 are preferably identical in structure, each being formed by continuing the sheet metal from the outer side of the crimped part 30. Each of said tongues 31 carries along its outer edge a flange 32 which is directed radially outward from the wing's curvature, said flange being of the proper size and shape to interlock with the aforementioned groove 25 of the detachable wing 8.

The groove-forming crimps 24 and 30 are both spaced a considerable distance inwardly from the outermost parts of the wings of which they form a part, thus making it possible to interengage the tongue portions 21 and 31 in the manner which has been described.

In the drawing the clamping unit A is shown applied to an elongated cylindrical member 40 which is of a considerably greater diameter than the smaller cylindrical body 41 to which the clamping member B is shown applied. Said smaller member 41 in this case may be the stationary tubular portion of the locking device described and claimed in the aforementioned patent.

While I have shown and described a specific embodiment of my invention I do not limit myself to the exact details of construction set forth, and the invention embraces such changes, modifications and equivalents of the parts and their formation and arrangement as come within the purview of the appended claims. For example, the position of the interlocking elements shown in Fig. 6 may be reversed without departing from the spirit of the claimed invention, and the opposed arcuate clamping wings may be otherwise shaped provided they are so contoured as to fit around opposite side portions of an object gripped between them.

I claim:

1. In a clamping device to secure a plurality of elongated members to each other, a clamp element to embrace one of said members, said element having a gap in a side thereof and at each side of the gap therein an extension which is parallel to its mate, a permanently attached wing having a shank that is formed by one of said extensions whereby said wing is united to said clamp element, said wing having beyond said shank an arcuate portion the concave side of which is abuttable against one side of one of the aforesaid elongated members, an arcuate detachable wing the concave side of which is abuttable against the latter elongated member in an opposed relation to said permanently attached wing, the free edges of both of said arcuate wing portions being contoured so as to be brought from a separated to an interlocking relation to each other during the placing of the clamp in its operative position and the detachable wing having a shank portion furnished with ears which are interfittable in an edgewise manner with at least one cooperating ear formed upon the aforesaid extension of said clamp element at that side of its gap, means extending through said ears of said detachable wing and the wing shank at the opposite side of said gap to draw the latter ears and shank toward each other in a secured, clamping relation, and means to draw the ear portion of said clamp extension toward the wing shank at the opposite side of said gap.

2. In a clamping structure of the kind described, two arcuate sheet metal clamp wings each of which has an outer portion adjacent to which the metal thereof is crimped from side to side of the wing thus providing an internal groove across each wing spaced inwardly from the outermost part of the wing, each of said wings having also at least one extension which terminates in an outwardly directed flange interlockable within the aforesaid groove of the other wing, said extension consisting of a continuation of the sheet metal beyond the crimp of the wing; and means detachably to secure together the edge portions of said wings which are opposite to their aforesaid outer portions.

3. In a clamping structure of the kind described, two arcuate sheet metal clamp wings each of which has an outer portion adjacent to which the metal thereof is crimped from side to side of the wing thus providing an internal groove across each wing spaced inwardly from the outermost part of the wing, one of said wings having an extension located at its mid-width which terminates in an outwardly directed flange interlockable with the aforesaid groove of the other wing, and the other of said wings having an extension at each side, said side extensions being spaced apart to admit between them said extension of the other wing and each having an outwardly directed flange interlockable with aforesaid groove of the other wing, said extensions all consisting of continuations of the sheet metal of the wings beyond their crimps, and means detachably to secure together the edge portions of said wings which are opposite to their aforesaid outer portions.

WILLIAM W. HURTEL.